United States Patent
Schittl

(10) Patent No.: US 8,946,949 B2
(45) Date of Patent: Feb. 3, 2015

(54) ELECTRIC POWER TOOL WITH AN ELECTRONIC COOLING

(75) Inventor: Josef Schittl, Thueringen (AT)

(73) Assignee: Hilti Aktiengesellschaft, Sahaan (LI)

( * ) Notice: Subject to any disclaimer, the term of this patent is extended or adjusted under 35 U.S.C. 154(b) by 179 days.

(21) Appl. No.: 13/432,982

(22) Filed: Mar. 28, 2012

(65) Prior Publication Data
US 2013/0076165 A1 Mar. 28, 2013

(30) Foreign Application Priority Data
Mar. 29, 2011 (DE) .......................... 10 2011 006 369

(51) Int. Cl.
*H02K 9/00* (2006.01)

(52) U.S. Cl.
USPC .............................................. 310/50; 310/52

(58) Field of Classification Search
USPC .................................... 310/50, 52, 54, 58, 64
See application file for complete search history.

(56) References Cited

U.S. PATENT DOCUMENTS

| 6,320,286 B1 | 11/2001 | Ramarathnam | |
| 6,633,097 B2* | 10/2003 | Dunlap et al. | 310/54 |
| 6,758,288 B2* | 7/2004 | Richter et al. | 173/217 |
| 7,990,005 B2* | 8/2011 | Walter et al. | 310/89 |
| 2003/0019644 A1 | 1/2003 | Richter et al. | |
| 2008/0287925 A1* | 11/2008 | Le et al. | 606/1 |
| 2011/0001368 A1* | 1/2011 | Lau | 310/50 |

FOREIGN PATENT DOCUMENTS

| CN | 201 730 868 U | 2/2011 |
| DE | 101 37 159 A1 | 2/2003 |
| DE | 10 2009 002 982 A1 | 11/2010 |
| EP | 1 281 485 A1 | 2/2003 |
| EP | 2 103 396 A1 | 9/2009 |
| WO | WO 2010/071054 A1 | 6/2010 |
| WO | WO 2010/146431 A1 | 12/2010 |

OTHER PUBLICATIONS

European Search Report, dated Nov. 7, 2012, 7 pages total.

* cited by examiner

*Primary Examiner* — Hanh Nguyen
(74) *Attorney, Agent, or Firm* — Crowell & Moring LLP

(57) ABSTRACT

An electric power tool for processing a substrate is disclosed. The electric power tool includes a tool which is designed to be rotatable around a rotational axis, a motor assembly having at least one motor which rotates the tool around the rotational axis, a motor housing having at least one receiving area for the at least one motor, a cooling element for cooling the at least one motor, and an electronic assembly having at least one electronic component to be cooled. The cooling of the at least one electronic component to be cooled is carried out via the motor housing.

5 Claims, 3 Drawing Sheets

ELECTRIC POWER TOOL WITH AN ELECTRONIC COOLING

This application claims the priority of German Patent Document No. 10 2011 006 369.2, filed Mar. 29, 2011, the disclosure of which is expressly incorporated by reference herein.

BACKGROUND AND SUMMARY OF THE INVENTION

The present invention relates to an electric power tool.

In the following, the term "electric power tool" includes wall saws and drilling equipment that have diamond tools equipped with cutting segments in the form of saw blades or drill bits; in addition to diamond tools, tools with cutting materials that function in a similar manner may also be used. Wall saws are used to cut through reinforced and un-reinforced walls, ceilings and floors made of concrete or similar substrates and are used in building construction and civil engineering for redevelopment and renovations. It may be necessary in demolition or remodeling work to cut through or tear down already existing concrete walls or cut out areas of the concrete walls. Drilling equipment is used to create boreholes in concrete, brick, masonry and other mineral substrates.

In the case of abrasive machining with diamond tools, it is necessary to cool the diamond tool in the region of the machining location in order to avoid damage to the diamond tool due to overheating. The cutting segments of the diamond tools are cooled during the machining process by means of a cooling fluid in order to support the machining process and increase the service life of the cutting segments. Because of the high power outputs of the cited electric power tools, the motor and the power electronics must also be cooled with a cooling medium along with the diamond tool. To guarantee the required cooling rates, air cooling of the motors and power electronics would produce power tools that are very large and heavy.

An electric power tool comprises a tool, which is designed to be rotatable around a rotational axis, a motor assembly having at least one motor which rotates the tool around the rotational axis, a motor housing having at least one receiving area for the motor, a cooling element for cooling the at least one motor and an electronic assembly having at least one electronic component to be cooled.

An electric wall saw known as the TS-5 comprises a motor housing for the motor assembly and an electronic housing for the electronic assembly. The to-be-cooled electronic components of the electronic assembly are mounted on a cooling element designed as a cooling plate. The cooling plate has a cooling structure with one or more cooling channels, through which a cooling medium flows for cooling. The cooling of the motor occurs via a cooling channel, which surrounds the motor in a spiral-shaped manner. The cooling medium flows into the electronic housing via an inlet port, flows through the cooling plate of the electronic cooling, then through the spiral-shaped cooling channel of the motor cooling and from there via a cooling borehole into the saw arm. The cooling medium flows via outlet openings in the saw blade flange and cools the saw blade during processing.

In the case of an electric wall saw known as the TS-20, the electronic assembly is not in the saw head, but housed in a separate supply unit. Like the TS-5, the electronic components of the electronic assembly are mounted on a cooling plate, which has a cooling structure with cooling channels. The saw head is connected to the supply unit via a line. The cooling circuit comprises the electronic cooling, the motor cooling and the saw blade cooling.

The disadvantage is that a cooling plate with cooling channels is required to cool the electronic assembly. In addition, the cooling medium flows through the electronic assembly, which increases the risk of a short circuit from moisture.

The object of the present invention is simplifying the cooling of the electronic assembly and reducing the number of structural elements required for the electronic cooling. Furthermore, the risk of a short circuit during cooling of the electronic assembly is reduced.

According to the invention, it is provided that the cooling of the at least one to-be-cooled electronic component of the electronic assembly is carried out via the motor housing. The number of sealing locations is reduced by integrating the cooling surfaces and/or cooling boreholes into the motor housing. As a result, the danger of the electronic components coming into contact with the cooling medium is reduced.

A cooling surface for an electronic component to be cooled is preferably provided on the motor housing. It is advantageous that the size of the cooling surface may be adapted to the electronic component to be cooled. As a result, the available construction space of the motor housing may be used in the best possible manner and the power tool may be designed to be smaller and lighter.

In a preferred embodiment, at least one cooling borehole for an electronic component to be cooled is provided in the motor housing. The advantage of the cooling borehole is that cylindrical electronic components such as, for example, braking resistors, may be cooled via the surrounding housing surfaces of the motor housing. The construction space of the motor housing is utilized and the power tool may be designed to be smaller and lighter.

It is especially preferred that at least one cooling surface is provided on the motor housing and/or at least one cooling borehole is provided in the motor housing for each to-be-cooled electronic component of the electronic assembly. The number of sealing locations is reduced because the cooling medium flows through only the cooling element. This reduction lowers the risk of the electronic components coming into contact with the cooling medium and the cooling medium causing damage to the electronic components.

Exemplary embodiments of the invention are described in the following on the basis of the drawings. These drawings are not necessarily supposed to represent the exemplary embodiments to scale, rather the drawings are executed in a schematic and/or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment may be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter which would be limited as compared to the subject matter claimed in the claims. In the case of any dimensioning ranges given, values within the stated limits are also meant to be disclosed as limit values, and be applicable at will and claimable. For the sake of simplicity, the same reference

DETAILED DESCRIPTION OF THE DRAWINGS

Figure 1:
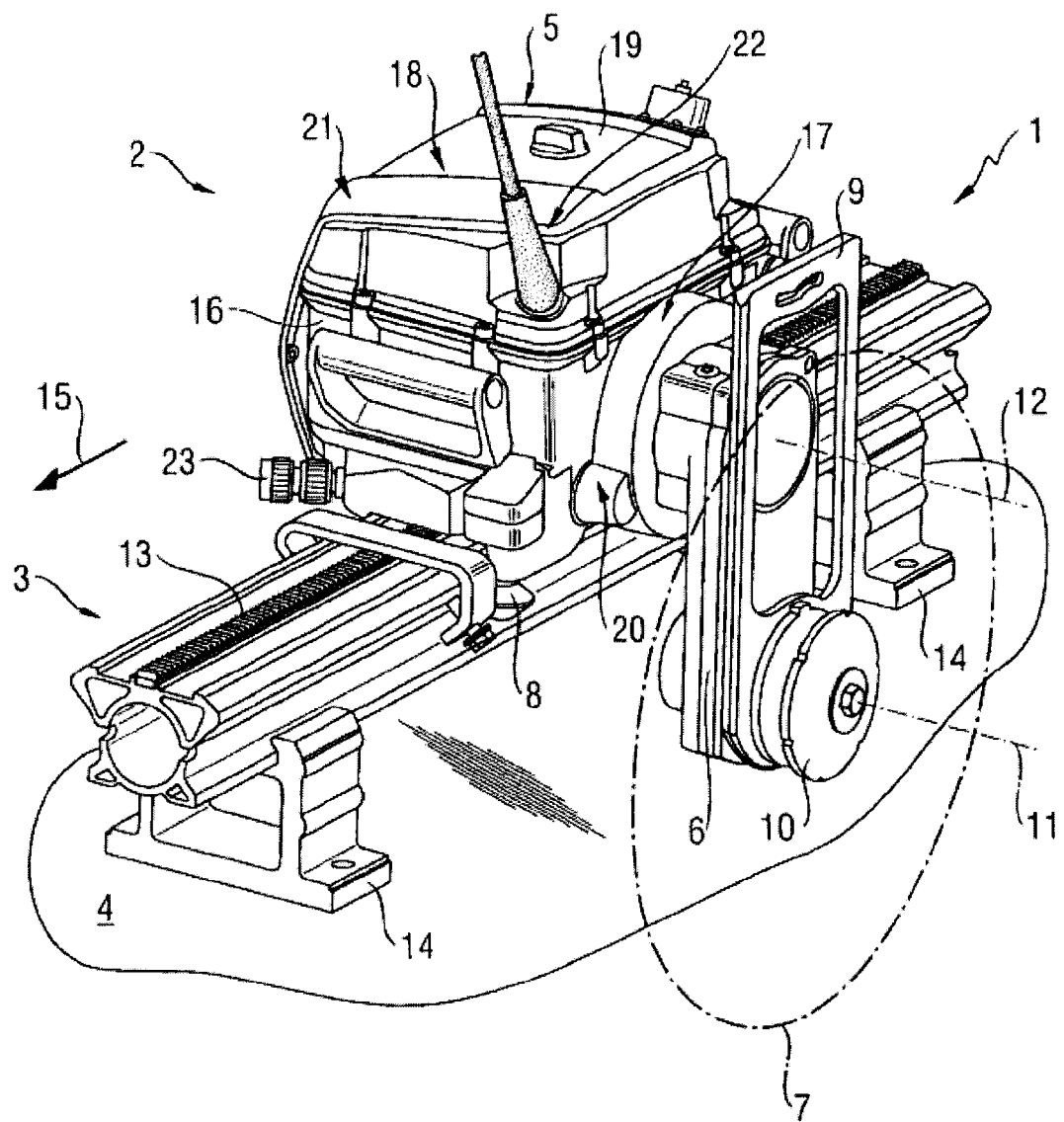
FIG. 1 is a three-dimensional representation of an electric power tool according to the invention having a saw head, which has a motor housing, a motor assembly, and an electronic assembly.

FIG. 1 shows a three-dimensional representation of an electric power tool according to the invention designed as an electric wall saw 1. The wall saw 1 is made of a sawing unit 2 and a fastening device 3 for fastening the sawing unit 2 on a substrate 4 to be processed.

The sawing unit 2 includes a saw head 5, a saw arm 6 on which a saw blade 7 is arranged, and a guide carriage 8. To protect the operator, the saw blade 7 may be surrounded by a saw blade guard, which is arranged on the saw arm 6 by a blade guard holder 9. The saw blade 7 is arranged on a saw blade flange 10 and is driven around a rotational axis 11 during sawing operation. The saw arm 6 is designed to swivel around a swivel axis 12; alternatively, the saw arm is designed to be adjustable with the aid of a linear drive or another drive device. The sawing unit 2 is fastened on the substrate 4 to be processed with the fastening device 3 made of a guide rail 13 and rail bases 14. The sawing unit 2 is arranged to be longitudinally displaceable via the guide carriage 8 on the guide rail 13 in a feed direction 15 as well as in a direction opposite from the feed direction 15.

The saw head 5 includes a motor housing 16, a motor assembly 17, an electronic assembly 18 and a housing cover 19. The motor assembly 17 includes a first motor 20 for the rotational movement of the saw blade 7 around the rotational axis 11, a second motor 21 for the swivel movement of the saw arm 6 around the swivel axis 12 and a third motor 22 for the feed motion of the guide carriage 8 along the feed direction 15. The electronic assembly 18 includes all electronic components of the power electronics. These are, among others, frequency converters 18a, 18b, and 18c for the motors 20, 21, 22, respectively, and a braking resistor 18d for dissipating the brake energy when decelerating the saw blade 7.

The cooling of the sawing unit 2 is carried out via a cooling medium, which is embodied, for example, as cooling fluid, cooling gas or compressed air. The cooling medium is stored in a separate vessel. The vessel is connected via a supply line to an inlet port 23, which is connected in-turn to the motor housing 16.

Figure 2:
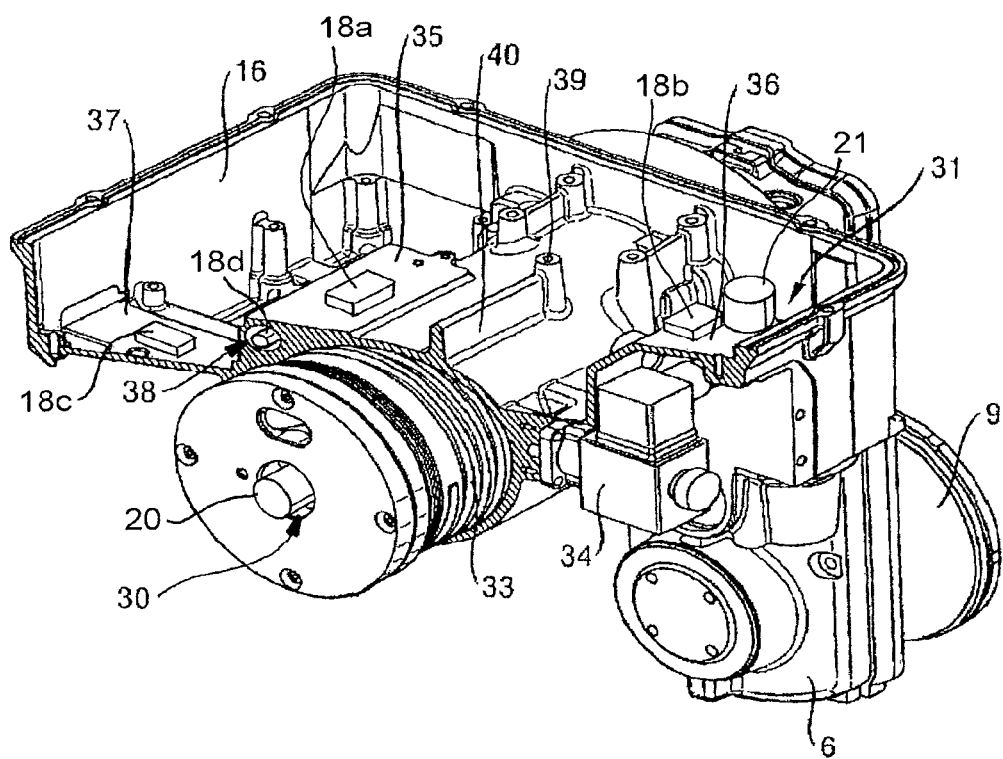
FIG. 2 is a partial section of the motor housing.

FIG. 2 shows a portion of the motor housing 16, in which the first motor 20 for the rotational movement of the saw blade 7 around the rotational axis 11 is installed. The motor housing 16 includes a first receiving area 30 for the first motor 20, a second receiving area 31 for the second motor 21 and a third receiving area 32 (in FIG. 3) for the third motor 22.

The cooling of the first motor 20 is carried out via a spiral-shaped cooling channel 33, which surrounds the first motor 20 and through which the cooling medium flows. The cooling medium flows out of the vessel via the supply line into the motor housing 16. The supply of the cooling medium to the cooling channel 33 is regulated by a valve device 34. Instead of the spiral-shaped cooling channel 33, a meandering cooling channel may be used, for example. In addition, several cooling channels may be provided, which are connected in series or in parallel.

Three cooling surfaces 35, 36, 37 and one cooling borehole 38 are provided in the motor housing 16. The frequency converter 18a for the first motor 20 is positioned on the first cooling surface 35 and connected to the motor housing 16 with the best possible heat transfer. The first cooling surface 35 is arranged very close to the cooling channel 33 and is therefore preferred with regard to the cooling effect as compared to the second and third cooling surfaces 36, 37. The electronic components to be cooled are distributed on the cooling surfaces in such a way that the electronic components having the greatest generation of heat are arranged as close as possible to the cooling channel 33. The less the generation of heat, the further away from the cooling channel 33 the electronic component may be arranged.

In order to improve the heat transfer from the electronic components to the motor housing 16, a heat conduction pad or a heat conduction paste may be provided between the electronic component and the cooling surface 35, 36, 37 of the motor housing 16. Because the cooling of the electronic components of the electronic assembly 18 is carried out exclusively via the motor housing 16, an adequate heat transfer must be guaranteed. To fasten the electronic components to be cooled to the motor housing 16, mounting domes 39 are provided in the motor housing 16, which are connected via reinforcing ribs 40.

Figure 3:
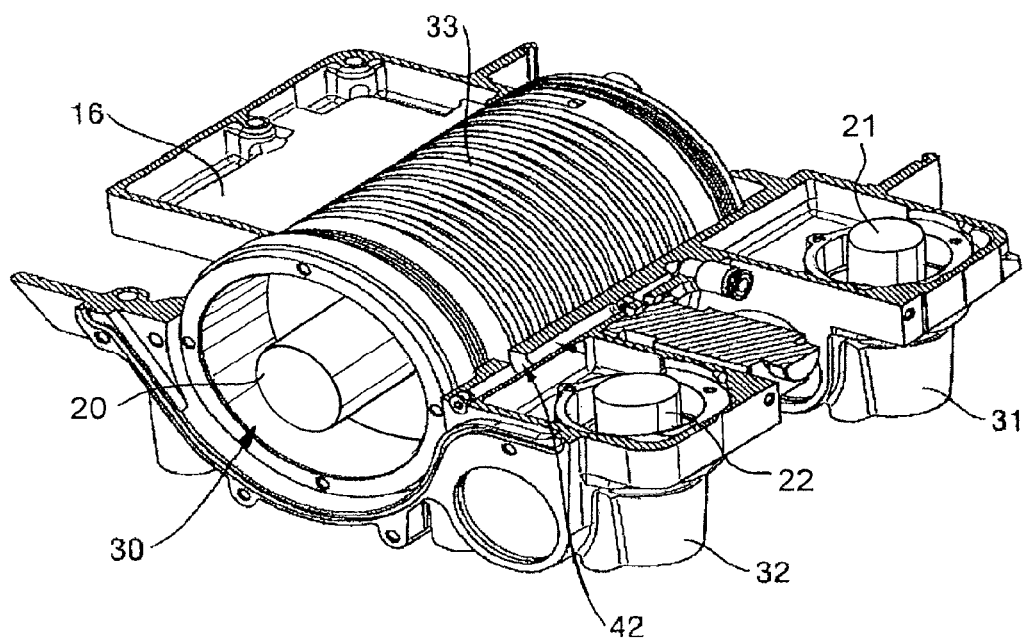
FIG. 3 is a cross-section through the motor housing.

FIG. 3 shows a cross-section through the motor housing 16 with the first receiving area 30 for the first motor 20, the second receiving area 31 for the second motor 21 and the third receiving area 32 for the third motor 22.

A longitudinal borehole 41 and a transverse borehole 42 leading into the longitudinal borehole 41 are provided in the motor housing 16. The cooling medium flows out of the valve device 34 via the longitudinal borehole 41 and the transverse borehole 42 into the cooling channel 33.

After the cooling medium has flowed through the cooling channel 33, the cooling medium may be redirected partially or completely into the saw arm 6 for the cooling of the saw blade 7 or the cooling medium is conveyed to an extraction device or a conditioning device. The quantity of cooling medium that is supplied to the saw blade 7 for cooling may be adjusted by a regulating device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric wall saw, comprising:
    a saw head having a saw blade, wherein the saw blade is arranged at a swivelable saw arm and is rotatable around a rotational axis, wherein the saw head is displaceable via a guide carriage in a feed direction;
    a motor assembly having a first motor, wherein the saw blade is rotatable by the first motor, a second motor, wherein the saw arm is swivelable around a swivel axis by the second motor, and a third motor, wherein the guide carriage is displaceable along the feed direction by the third motor;
    a motor housing with a first receiving area, wherein the first motor is disposed within the first receiving area, and a second receiving area, wherein the second motor is disposed within the second receiving area, and a third receiving area, wherein the third motor is disposed within the third receiving area;

a cooling channel through which a cooling medium flows, wherein the first motor is coolable by the cooling channel which surrounds the first motor; and an electronic assembly with an electronic components including a first frequency converter for the first motor, a second frequency converter for the second motor, a third frequency converter for the third motor and a braking resistor for dissipating brake energy when decelerating the saw blade;

wherein cooling of the electronic components of the electronic assembly is carried out exclusively via the motor housing and the motor housing includes a first cooling surface, wherein the first frequency converter is arranged on the first cooling surface, a second cooling surface, wherein the second frequency converter is arranged on the second cooling surface, a third cooling surface, wherein the third frequency converter is arranged on the third cooling surface, and a cooling borehole, wherein the braking resistor is arranged in the cooling borehole.

2. The electric wall saw according to claim 1, wherein the cooling channel is spiral-shaped.

3. The electric wall saw according to claim 1, wherein the cooling channel is not disposed in the first, second, and third cooling surfaces.

4. The electric wall saw according to claim 3, wherein the cooling surfaces are disposed in proximity to the cooling channel.

5. The electric wall saw according to claim 4, wherein the cooling surfaces do not include cooling channels, wherein a cooling medium is flowable through the cooling channels.

* * * * *